United States Patent
Hertling et al.

(10) Patent No.: US 7,921,037 B2
(45) Date of Patent: Apr. 5, 2011

(54) PERSONALIZED MESSAGING DETERMINED FROM DETECTED CONTENT

(75) Inventors: William Edward Hertling, Portland, OR (US); Michael Dean Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2417 days.

(21) Appl. No.: 10/113,397

(22) Filed: Apr. 1, 2002

(65) Prior Publication Data

US 2003/0187733 A1 Oct. 2, 2003

(51) Int. Cl.
*G06Q 30/00* (2006.01)
(52) U.S. Cl. .................................................. 705/14.67
(58) Field of Classification Search ............. 707/102, 707/516; 379/266.01, 90; 348/460; 358/1.15; 704/235
See application file for complete search history.

(56) References Cited

U.S. PATENT DOCUMENTS

| | | | | |
|---|---|---|---|---|
| 5,619,558 A | * | 4/1997 | Jheeta | 379/92.01 |
| 6,332,120 B1 | * | 12/2001 | Warren | 704/235 |
| 6,577,346 B1 | * | 6/2003 | Perlman | 348/460 |
| 7,158,986 B1 | * | 1/2007 | Oliver et al. | 707/102 |
| 2002/0040374 A1 | * | 4/2002 | Kent | 707/516 |
| 2002/0063885 A1 | * | 5/2002 | Dutta | 358/1.15 |
| 2002/0191775 A1 | * | 12/2002 | Boies et al. | 379/266.01 |

OTHER PUBLICATIONS

"Database," www.whatis.com, accessed from www.archive.org (archived Dec. 8, 2000).*
"Speech Recognition," www.whatis.com, accessed from www.archive.org (archived Dec. 12, 2000).*
"Voice Over Internet Protocol," www.whatis.com, accessed from www.archive.org (archived Aug. 16, 2000).*

* cited by examiner

*Primary Examiner* — John G Weiss
*Assistant Examiner* — Saba Dagnew

(57) ABSTRACT

Personalized messages can be generated according to contents detected in communications between parties to a commercial transaction. The information streams between parties is monitored; spoken keywords, images, video or textual data are detected by pattern recognition, voice recognition or text matching. One or more subjects of the communication detected from recognized keywords, images, video or text data are used to generate a personalized message to one or more participants according to the detected subjects.

26 Claims, 2 Drawing Sheets

PERSONALIZED MESSAGING DETERMINED FROM DETECTED CONTENT

BACKGROUND OF THE INVENTION

It is well-known now that the Internet has created new business opportunities for traditional businesses by enabling goods and services to be sold on-line. The Internet has also spawned entirely new business centered around on-line transactions. At least one new business that was enabled by the Internet is known as on-line print brokering.

Entities with large, commercial printing needs can frequently fulfill their print need on their own equipment, however, many entities prefer to obtain printing services from print service providers that have the equipment and expertise required to print high-quality work, as it is needed.

On-line print brokering is an on-line (Internet-enabled) printing service that can be provided by one or more print service providers through a third-party or factor who acts as an agent. The third-party broker is embodied as a web site or web page through which communications between a customer and the print service providers takes place but also through which the print job from the customer is transferred between the customer and a print service provider that performs the customer's required service.

Customer information can be vital to a print services provider (as well as any other kind of service provider) that tries to build business through customer-good will. Advertising, promotions or special offers that are of little or no interest to either a customer or a prospective customer are not likely to yield results. Targeted promotions are more likely to yield results if they can be effectively directed to specific customers or types of customers.

Customer information can be obtained in a variety of ways. Developing customer information typically requires customer contact over a period of time. Business transactions and associated communications can frequently provide information as to what is important and what is not important to the customer. Determining the needs of a particular customer of a service provider, including a print provider, over time can provide an economic advantage to service providers trying to develop other business opportunities targeted at existing customers.

DETAILED DESCRIPTION OF THE PREFERRED EMBODIMENT

As used herein, the term "online print brokering" should be construed as the provision of print services by one or more on-line print service providers, to an entity needing various kinds of print services, via an intermediary embodied as an Internet web site or web page. In other words, a print brokering system provides printing services to a customer as an agent of both the print customer and print service provider, albeit via the Internet.

While the embodiment disclosed herein pertains to online print brokering, the methodology and devices disclosed herein are equally applicable to virtually any type of on-line commerce, as those skilled of ordinary skill in the art of so-called "e-commerce" will recognize.

Figure 1:
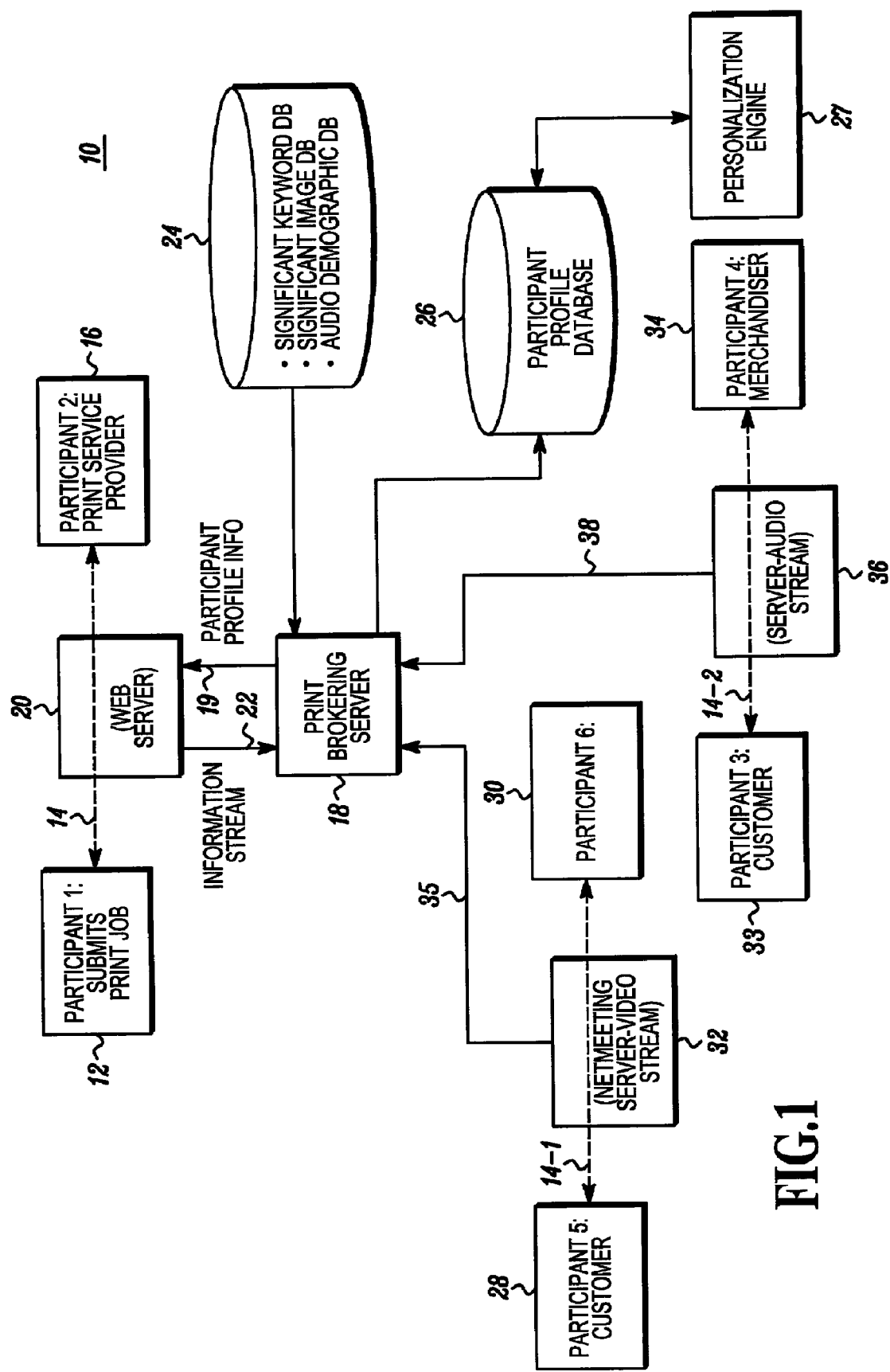
FIG. 1 is a simplified block diagram illustrating one exemplary embodiment of a print brokering system provided via a network, such as the Internet, by which custom or personalized messages can be generated and sent from contents of an information stream.

FIG. 1 shows a block diagram of an on-line print brokering system 10. An entity or print brokering system participant 12 needing printing services can indirectly submit a print job 14 to a print service provider 16 by sending the print job 14 (as well as any other pertinent information) to the print service provider 16 via a web-based print brokering server computer 18.

In the on-line print brokering system 10 shown in FIG. 1, a person, business or other entity needing printing services is referred to herein as a "participant" A "participant" person communicates with the system 10 via the participant's computer, which is known as, and considered to be a "client" computer. In FIG. 1, reference numeral 12 identifies such a "client" computer. (The label within the box identified by reference numeral 12 identifies the client computer as submitting a print job.) As set forth below, other "client" computers (to the server 18 as well as other servers 20, 32 and 36) include the "participant" computers (i.e., clients) identified by reference numerals 16, 28, 30 and 34 because each of these other participant computers communicates with the server 18 as well as other putative servers. The concepts and the meaning of "client" and "server" are well-known to those or ordinary skill in the computer network art. For purposes of this disclosure, "client" and "server" include any computer or processor that can communicate with other computers or processors using Internet protocol as well as any other data communication protocol.

The print job 14 typically comprises one or more computer files, the data of which represents a document (book, magazine, etc.) that needs to be printed. A print job can include font files, graphics files, text files as well as instructions (written, electronic or oral) as to how to complete a particular printing task. The files that comprise a print job 14 can be "posted" by the print brokering server 18 so as to allow them to be downloaded (copied) by service providers who are granted access to the web site, or access to the print job files by the server 18.

In the embodiment shown in FIG. 1, a print services customer, identified in FIG. 1 as a participant client 12, submits a print job 14 (and any ancillary communications or information) to web-based server 20 that operates under the control and direction of the print brokering server 18. (In an alternate embodiment, the functionality of the web server 20 can also reside on the machine that functions as the print brokering server 18.) The web server 20 forwards the information stream 22 that is the print job 14 and other ancillary instructions to the print brokering server 18 for storage and processing as set forth hereinafter.

When the print job 14 is posted to the web based server 20, the server 20 can pass the print job 14 information to the print brokering server 18 which can then post the job to one or more print service provider clients 16 so as to provide to the print service provider clients 16 opportunity to bid on the print job 14. The print job 14 files as well as ancillary communications (whether stored in files or as video or audio streams) are considered to be "information stream" from which information can be extracted.

The information stream 22 from the web server 20 to the print brokering server 18 can be comprised of print job content, (considered to be material (data) and information that forms the print job) but with many print jobs, also including "customer communications" in the form of spoken words, graphic or video images, or text files coupled to, or associated with print job data files. When an information stream 22 is received at the server 18, the server 18 accesses a database 24 wherein significant keywords, significant images and an audio demographic database are stored. The database 24 wherein digital representations of keywords, images and audio demographic signals are stored is known as a customer communications database 24.

In a preferred embodiment, the customer communications database 24 stores keyword text as strings of characters. Pictures and graphics can be stored using a variety of file formats such as JPEG, GIF, BMP or other formats known to those of skill in the art. Audio signals that represent spoken keywords or spoken phrases, including any special demographic pronunciations of the keywords, are digitized into audio files to form a dictionary of recognizable audio signals.

The print brokering server 18 processes the information stream 22 to determine whether a keyword exists in the information stream 22 and whether it contains any other information that might suggest a subject of interest (or importance) to the print service customer 12. A "subject" of interest to the print service customer can include anything likely to be of interest or important to the customer. By way of example, a print services customer in the banking business might have communications with the print services provider that include terms such as "statements" "accounts" "checks" "deposits" "drafts" "balances." Subjects of interest to a bank would include financial services and financial news as well as printing services required to provide its services. Over time, the recurrence of certain terms in the communications between the bank and the print services provider will tend to identify topics which the bank deals with.

A print services provider can benefit from knowing topics or subject matter (i.e., subjects) of interest to the bank and it's business. Among other things, a print service provider could offer special printing services or discounts for increased volumes of work. A subject can include any kind of information, of interest to a print services customer.

By checking content and other communications from the customer 12 over time, the server 18 can build a customer/participant profile of words, images and/or text that have been used by the customer/participant and which can indicate the type of business that the customer is in, services the customer might (or might not) be interested in, a customers interest in or need for special offers, products, goods, services etc. The customer's profile is saved in a participant profile database 26 for subsequent use by the server 18. The participant profile information 19 can also be sent back to the participant 12 as well as the print service provider client 16.

The servers shown in FIG. 1 are typically embodied as one or more computers (or so-called "work stations") equipped with data communications equipment as well as capabilities to access the Internet, all of which are well-known to those of skill in the art. Databases 24 and 26 shown in FIG. 1 include memory storage devices, such as random access memory, disk storage, CD-ROM or other suitably capable data storage hardware wherein data can be selectively stored and retrieved.

Those of ordinary skill in the e-commerce art will recognize that in addition to providing an on-line print brokering service, the components of the system 10 shown in FIG. 1 (and the communications between them and the processing they perform) find application in other on-line businesses that sell either goods or services by detecting subject or topics of interest to customers of other on-line business. The scope of the claims appended hereto should not be construed as being limited to application to on-line print brokering systems and methods. In addition to capturing and/or detecting keyword text, the constituent elements of the system 10 can also be used to detect video images, graphic images as well as audio.

In another aspect of the embodiment shown in FIG. 1, a second (i.e. another) customer of either a print service provider (or other e-commerce business) client 28 can be engaged in a video teleconference with a merchandiser 30 via a video teleconference server 32 capable of routing video. The term "merchandiser" client 30 includes of course a print services provider but also includes vendors of other goods and services.

In the case of a video teleconference, an "information stream" 14-1 comprised of video frames, but also possibly including graphic images as well as audio, passes between the participant clients 28 and 30 via a video teleconference server 32. A copy 35 of the video teleconference signals is sent to the print brokering server 18 for analysis (e.g., recognition and extraction of keywords and images and possible storage of the teleconference). The video teleconference server 32 is designed and constructed to accept and transmit video streaming between the customer client 28 and a merchandiser client 30 but also to copy the real-time copy 35 for processing. In embodiments where the transaction and communications between the customer 28 and the merchandiser 30 is not related to printing services, the so-called print brokering server 18 would function to broker other goods and services. In such an embodiment, the "print brokering server" would bear a different name.

The video teleconference server 32, (which is considered to be an information stream sever) is operatively linked to the server 18 via well-known data pathways, not shown for simplicity, so as to allow the copy 35 of the video stream between the customer client 28 and the merchandiser client 30 to be forwarded to the server 18 for subsequent analysis and storage.

In yet another aspect of a preferred embodiment, another customer/participant 33 exchanges streaming audio signals 14-2 with still another print service provider or other participant-merchandiser 34 via a web-based server 36 designed and configured to conduct streaming audio via the Internet or other data network. Likewise, the streaming audio 14-2 (which is also an information stream) is copied 38 and sent to the server 18 via an appropriate data link so as to allow the audio information stream 14-2 exchange between the customer/participant 33 and print service provider/merchandiser client 34 to be passed to the server 18 for signal processing.

Servers 18, 20, 32 and 36 can be implemented as separate computers, but can also be implemented as separate functionalities on a single computer. Each of them includes appropriate network interface hardware, (e.g., Ethernet or other protocol) memory, software and a processor, all well known to those of skill in the art, by which they are able to perform the functions of receiving an information stream from the network. In the case of the print services broker 18, it also includes appropriate software and hardware to detect spoken utterances, images as well as character strings in the information streams it receives via the network and to identify subjects in the information stream. Inasmuch as servers 32 and 36 enable streaming video and streaming audio respectively, those of skill in the art will recognize that the data paths between their respective participants 28 and 30; 33 and 34 must be suitably capable of transferring data over the Internet near synchronously so as to render an acceptable level of quality video and quality audio. Servers 32 and 36 are equipped with appropriate video equipment, well known to those of skill in the art, to generate and detect such signals.

The client computers 12, 16, 28, 30 and 34 are equipped with appropriate network interfaces, (e.g., Ethernet or other protocol) by which they can exchanged data communications between themselves and the servers, including the transmission or sending of information-bearing signals to the servers as well as receiving any messages sent to them by the servers. Like the servers, they will of course also include appropriate communication and application software, memory and a processor by which program instructions can be executed so as to give the functionality described herein.

Inasmuch as an objective of the present invention is the identification of subject matter of interest to customers, the information streams exchange between the various participants 12/16; 28/30; 33/34 are collected at the print brokering server 18 for processing. The server 18 is configured to scan the information streams, whether they are character based, video streams, or audio streams, and detect therein information-bearing character strings, graphic or video images, or sounds which identify a topic or subject of interest to the various participants.

Detecting information in text strings, video, and audio is not trivial but not beyond the know-how of those of ordinary skill in the art of digital signal processing. Indeed, numerous sorting algorithms have been developed to search for particular strings of text in files. Speech recognition software is readily available that will identify the words in a vocabulary. Pattern matching can be used to recognize images or video frames in the case of video and graphic images. Emotional cues can be obtained from traits of the communication stream such as rate of speech, tone of voice, compared to previously recorded samples for the case of emotional cues. Demographic cues may be determined through detection of accent, pronunciation of particular words, use of phrases or particular combinations of words in the communication stream. These aspects are not essential to provide profiling information based on communications streams, but may increase the accuracy or value of said profiling information.

Over time, a library of terms, images or video used by the customer can be assembled from content detected in the messages passed between a customer and a service provider. A user profile can be assembled and used to identify particular messages to send to a customer. By way of example, if a customer 12 routinely uses medical terms in his advertising copy sent to a print service provider, a profile of the customer would indicate a high-likelihood that the customer conducts business in, or with, the medical profession. Sending commercial promotions to the customer 12 that are related to the medical profession is likely to yield better results than non-specific advertising. Particular messages for particular customer-types can be stored in memory 24 or 26 for retrieval and transmission via the Internet.

A personalization engine 27 includes a processor, software and a personalized message database of templates from which messages for particular customers can be retrieved. The personalization engine is programmed to build targeted messages of interest to the customer 12. Such messages can be sent using e-mail, or personalized web pages and are targeted to the user based on profile data stored in 26. Such messages can also be delivered using the U.S. Postal Service, fax or any other delivery mechanism. Examples of personalized messages would include special promotional offers or services of a print service provider to a particular customer 12, based at least in part on content detected in the information streams sent to the print brokering server.

Figure 2:
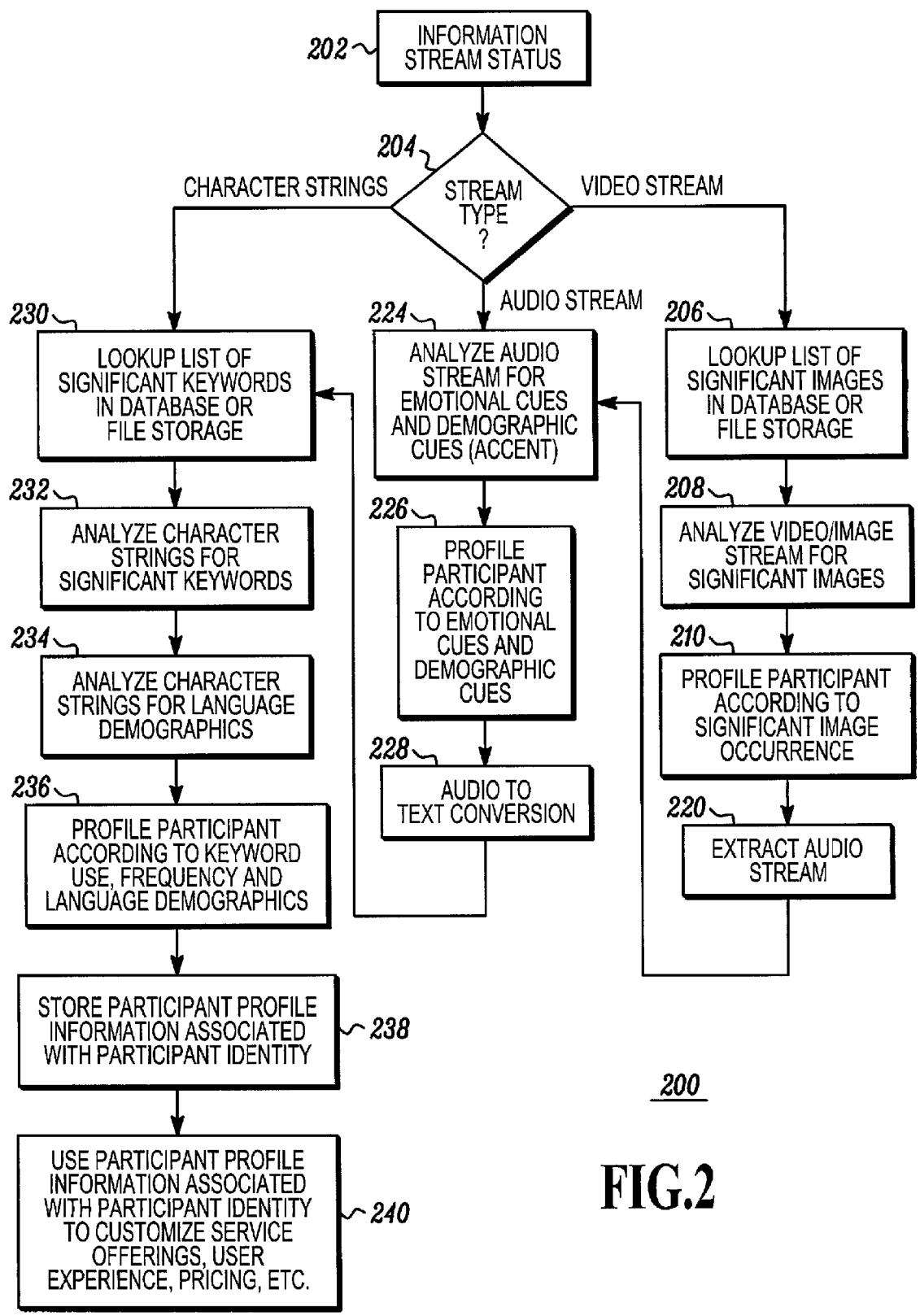
FIG. 2 depicts an embodiment of a method for detecting predetermined utterances, keywords, images or character strings from a customer in order to identify and send messages of interest to the customer based upon detected information.

FIG. 2 depicts a flowchart of the processes performed by the various computers depicted in FIG. 1, in order to be able to provide personalized messages that are determined from detected content.

The process for detecting subjects from video, audio or character strings begins at step 202, where an information stream is received by a server, such as the print brokering server 18 depicted in FIG. 1. The information stream could be either a character based information stream 22, a video stream 34 or an audio stream 38. At step 204, the type of stream being received (by the server 18 for instance) is determined using, for example, MIME, file headers, or by a byte-by-byte analysis.

"MIME" is an acronym for multipurpose internet mail extensions, which is a specification for formatting non-ASCII messages so that they can be sent over the Internet Many e-mail clients support MIME, which enables them to send and receive graphics, audio, and video files via the Internet mail system. In addition, MIME supports messages in character sets other than ASCII. There are many predefined MIME types, such as GIF graphics files and PostScript files.

As a result of the determination in step 204 that a video stream was received, in step 206 the recipient of the video stream video server looks up in a database a list of significant images in storage. In step 208, a frame-by-frame or image-by-image, or a sampling of frames or images, is compared to the images or frames stored in the database, such as the database 24 depicted in FIG. 1.

Upon the detection of a match of an image or frame from step 208, in step 210 a profile is created or updated to reflect the detection of a particular image or video frame in step 208. Over time, the detection of one or more particular images or frames in a video stream from the participant may indicate one or more subjects of interest or importance to the stream sender, i.e. one or more of the participants.

Inasmuch as most video streams are almost always accompanied by audio streams as well, in step 220 the video stream received at the server 18 is tested for audio content as well. (Such audio might be the audio sent between a customer 33 and merchandiser 34 in FIG. 1.) In step 224 the audio stream is tested for word content, emotional cues and demographic cues if any so as to further identify the speaker in any detected audio stream.

A speaker can be identified by separating the communication streams for each speaker. In other words, a conversation consists of two communication streams, one in each direction. Each communication stream is associated with the identity of the participant as part of the process of initiating the communication stream. For example, entering a telephone number, or email address would identify the participant. Although the primary channel of data of interest is that of the customer, understanding the context requires analysis of both.

If the audio stream is determined to include recognizable speech, the individual's recognized speech is categorized in step 226 so as to profile the speaker according to detected demographic cues and/or emotional cues in the detected speech.

In step 228 the spoken audio is converted to text using appropriate speech processing. At step 230, the converted text is compared against a list of keywords in a database to determine the occurrence and/or frequency of certain keywords.

In step 232 the keywords converted to text at step 228 are compared against or analyzed against database copies of particular keywords to determine their occurrence. Language characteristics are analyzed in step 234 to determine if there are any identifiable language demographics that might further identify the speaker and/or characterize his speech. The profile of the speaker is created in step 236 using the keywords that were detected, the frequency, tonality characteristics and other language demographics.

Using the identified keywords, the frequency and tonal qualities of the speech, and other language demographics as well as the recognized and/or identified audio and emotional cues from the extracted audio and also using any identified images, a profile of the participant(s) in the information stream is created in step 238. The profile can be thereafter used in step 240 to identify for the particular customer, service offerings, targeted ads, promotions, or other personalized messages based upon the profile of the individual whose information stream was intercepted and forwarded on to the server for processing as shown in FIG. 2. Personalized messages in the form of advertisements, special promotions or other targeted messages, the contents of which are adjusted according to the detected subjects can be formulated by a personalization engine 27 from a message data base as well as using the customer communications database 24 and sent to the customer. The term personalized message should be construed to mean any sort of message or service proposal, targeted message or targeted advertising sent to a participant in step 240 of FIG. 2 upon the identification of a subject or subjects of interest from the user profile created in step 238.

Returning to step 204, if it is determined that the information streams 22, 34 and 38 do not contain any video but instead contain only audio, program control passes from step 204 directly to step 224 and bypasses steps 206, 208, 210 and 220. Similarly if the intercepted information stream is determined to contain only character strings, program control transfers from step 204 directly to step 230. Program control is otherwise the same for all steps thereafter.

As used herein, the term "information stream" should be construed to mean a stream of spoken utterances or words, one or more video frames, one or more still images, or character strings. Such spoken utterances, video, still images, or character strings may take the form of analog signals but which are preferably converted to a digital format to be readily transported across a data network.

With respect to the embodiments that contemplate streaming audio and video, those skilled in the art of data communications will recognize that video and audio on the Internet can be realized using voice over IP protocol (VoIP) which provides a near synchronous transfer of video and audio signals between two points on the Internet. Inasmuch as the systems and methods disclosed herein are performed in large part by computers, the systems and methods are performed according to executable computer program instructions. Such instructions are ordinarily stored on computer media that includes magnetic or optical disk, or CR-ROM disks as well as magnetic tape or within semiconductor memory devices as well.

What is claimed is:

1. A method of providing personalized messages from detected content in an information stream sent between participants comprising the steps of:
   receiving an information stream including at least one of: an audio stream; a video stream; a still image frame; textual data, the information stream received from a customer of a print service provider and received by a print brokering server, the print service provider to print a print job received from the customer, the print service provider being a business, the print service provider receiving the print job from a web server other than the print brokering server;
   detecting in said information stream, at least one of a predetermined: a spoken keyword; an image; or character string;
   determining a subject in said information stream from said at least one spoken keyword, image, or character string;
   sending to at least one participant including the customer of the print service provider, a personalized message related to said subject, the personalized message further related to services provided by the print service provider to the customer, wherein the personalized message is sent in a manner other than by being printed as part of the print job by the print service provider.

2. The method of claim 1 wherein said step of receiving said information stream includes the step of monitoring a voice communication between the customer and the print services provider.

3. The method of claim 1 wherein said step of receiving said information stream includes the step of: monitoring a voice-over-internet protocol (VOIP) communication between the customer and the print services provider.

4. The method of claim 1 wherein said step of receiving said information stream includes the steps of:
   monitoring a voice communication between the customer and the print services provider;
   identifying spoken words by way of speech recognition.

5. The method of claim 1 wherein said step of receiving said information stream includes the step of monitoring a video signal between the customer and the print services provider.

6. The method of claim 1 wherein said step of receiving said information stream includes the steps of:
   monitoring a video signal carried between the customer and the print services provider, said video signal being comprised of video frames;
   identifying images by pattern matching in at least one video frame of said video signal.

7. The method of claim 1 wherein said step of receiving said information stream includes the steps of:
   monitoring a video signal carried between the customer and the print services provider via a data network, said video signal being comprised of video frames;
   identifying images by pattern matching in at least one video frame of said video signal.

8. The method of claim 1 wherein said step of receiving said information stream includes the step of monitoring a data stream of characters between said customer and the print services provider.

9. The method of claim 1 wherein said step of sending to at least one participant, a personalized message particularly related to said subject of said information stream includes the step of sending a personalized advertising message selected according to said keyword, image, or character string.

10. The method of claim 1 wherein said step of sending to at least one participant, a personalized message particularly related to said subject of said information stream includes the step of providing a personalized service according to said keyword, image, or character string.

11. The method of claim 1 wherein said step of sending to at least one participant, a personalized message particularly related to said subject of said information stream includes the step of adjusting the price of a service or product according to said spoken keyword, image, or character string.

12. The method of claim 1, further including generating participant profile information according to association of said keyword, image, or character string with participant identity.

13. A method of receiving personalized messages that are generated from content detected in an information stream exchanged between a participant and a print service provider comprising the steps of:

sending an information stream from a participant to print service provider via a print brokering server, said information stream including at least one of: an audio stream; a video stream; a still image frame; textual data that is related to a subject of interest to said participant, the participant being a customer of the print service provider, the print service provider to print a print job received from the customer, the print service provider being a business, the print service provider receiving the print job from a web server other than the print brokering server;

receiving from said print brokering server, a personalized message that is related to said subject, the personalized message received by the customer, the personalized message further related to services provided by the print service provider to the customer, wherein the personalized message is sent in a manner other than by being printed as art of the print job by the print service provider.

14. The method of claim 13 wherein said step of sending an information stream includes the step of: sending a voice-over-internet protocol (VOIP) communication between said participant and said print brokering server.

15. An apparatus for providing personalized messages from content identified using information in data sent from a first party to a second party via a network comprised of:

a print brokering server, said print brokering server being operably programmed to:
  receive an information-bearing data stream from a customers computer via a data network;
  detect in said information-bearing data stream at least one of: spoken utterances, an image, or a character string;
  identify at least one subject from detected utterances, image or character string; and
  sending to the customers computer, a message related to said subject of said information stream,
wherein the first party is a customer of a print service provider, and the second party is the print service provider, the print service provider to print a print job received from the customer, the print service provider being a business, the print service provider receiving the print job from a web server other than the print brokering server, and
wherein the message is personalized and is related to services provided by the print service provider to the customer, and the personalized message is sent to the customer in a manner other than by being printed as part of the print job by the print service provider.

16. The apparatus of claim 15 further comprised of:
a customer communications database, operably coupled to said print brokering server, said customer communications database storing a record of at least one of: recognized utterances; recognized images; recognized character strings.

17. The apparatus of claim 1 wherein said record comprises at least one of: recognized utterances; recognized images; and, recognized character strings.

18. The apparatus of claim 15 further comprised of:
a personalized message database, operably coupled to a first computer, said personalized message database storing at least one message to send to said customer's computer from said print brokering server via said data network in response to the first computer's identification of a subject of said information stream.

19. A system for providing customized messages that are created using information in data sent from a first party to a second party via a data network comprised of:

a first computer, operably coupled to a data network by which information streams can be routed, said first computer generating an information stream and sending said information stream to a print brokering server via said data network;

a print brokering server, said print brokering server being operably coupled to said data network and receiving there from, said information stream from said first computer, said print brokering server being operably programmed to:
  detect in said data stream at least one of: spoken utterances, an image, or a character string;
  identify at least one subject from detected utterances, image or character string and sending to at least one participant, a message related to said subject of said information stream,
wherein the first party is a customer of a print service provider and the second party is the print service provider, the print service provider to print a print job received from the customer, the print service provider being a business, the print service provider receiving the print job from a web server other than the print brokering server, and
wherein the message is personalized and is related to services provided by the print service provider to the customer, and the personalized message is sent to the customer in a manner other than by being printed as part of the print job by the print service provider.

20. A computer storage medium, storing computer program instructions enabling a computer to:

receive an information-bearing data stream from another computer of a customer of a print service provider via a data network, the information-bearing data stream received by a print brokering server for a print service provider, the print service provider to print a print job received from the customer, the print service provider being a business, the print service provider receiving the print job from a web server other than the print brokering server;
detect in said data stream at least one of: spoken utterances, an image, or a character string;
identify at least one subject from detected utterances, image or character string and
send to said other computer, a message related to said subject of said information stream, the message being personalized and received by the customer of the print service provider, the message related to services provided by the print service provider to the customer, wherein the personalized message is sent in a manner other than by being printed as art of the print job by the print service provider.

21. A computer storage medium containing program instructions enabling a computer to:

send information-bearing data to a print brokering computer via a data network, the information-bearing data sent by a customer of a print service provider, the print service provider to print a print job received from the customer, the print service provider being a business, the print service provider receiving the print job from a web server other than the print brokering computer;

include in said data: a spoken utterance, an image, or a character string usable by the print brokering computer to identify at least one subject; and receive from said print brokering computer a personalized message related to the at least one subject, the personalized message being received by the customer, and is related to services provided by the print service provider to the customer, wherein the personalized message is sent to the customer in a manner other than by being printed as part of the print job by the print service provider.

22. A print brokering server comprised of:

means for receiving an information-bearing data stream from a customer's computer via a data network, the information-bearing data stream received by a print brokering computer for a print service provider, the customer being a customer of the print service provider, the print service provider to print a print job received from the customer, the print service provider receiving the print job from a web server other than the print brokering computer;

means for detecting in said information-bearing data stream at least one of: spoken utterances, an image, or a character string;

means for identifying at least one subject from detected utterances, image or character string; and means for sending to the customer's computer, a message related to said subject of said information stream, the message being a personalized message received by the customer, and is related to services provided by the print service provider to the customer, wherein the personalized message is sent in a manner other than by being printed as part of the print job by the print service provider.

23. The print brokering server of claim 22 wherein said means for receiving, said means for detecting, said means for identifying and said means for sending, are comprised of at least one processor and executable program instructions.

24. In a print brokering system, a client computer comprised of:

means for sending an information stream from a participant to print service provider via a print brokering server, said information stream including at least one of: an audio stream; a video stream; a still image frame; textual data that is related to a subject of interest to said participant, where the participant from which the information stream is received is a customer of the print service provider, the print service provider to print a print job received from the customer, the information stream specifically being received by the print brokering server, the print service provider being a business, the print service provider receiving the print job from a web server other than the print brokering server;

means for receiving from said print brokering server, a personalized message that is related to said subject, the personalized message received by the customer of the print service provider, the personalized message related to services provided by the print service provider to the customer, the personalized message sent to the customer in a manner other than printed as part of the print job by the print service provider.

25. The print brokering system of claim 24 wherein said means for receiving, and said means for sending, are comprised of at least one processor and executable program instructions.

26. In a print brokering system, a client computer comprised of:

a processor, capable of sending an information stream from a print service provider via a print brokering server, said information stream including at least one of: an audio stream; a video stream; a still image frame; textual data that is related to a subject of interest to said participant and for receiving from said print brokering server, a personalized message that is related to said subject, wherein the information stream is sent by a customer of the print service provider, the print service provider to print a print job received from the customer, the print service provider being a business, the print service provider receiving the print job from a web server other than the print brokering server, and wherein the personalized message is related to services provided by the print service provider to the customer, the personalized message being sent to the customer in a manner other than by being printed as part of the print job by the print service provider.

* * * * *

UNITED STATES PATENT AND TRADEMARK OFFICE
CERTIFICATE OF CORRECTION

| | | |
|---|---|---|
| PATENT NO. | : 7,921,037 B2 | Page 1 of 1 |
| APPLICATION NO. | : 10/113397 | |
| DATED | : April 5, 2011 | |
| INVENTOR(S) | : William Edward Hertling et al. | |

It is certified that error appears in the above-identified patent and that said Letters Patent is hereby corrected as shown below:

In column 9, line 22, in Claim 13, delete "art" and insert -- part --, therefor.

In column 9, lines 33-34, in Claim 15, delete "customers" and insert -- customer's --, therefor.

In column 9, line 40, in Claim 15, delete "customers" and insert -- customer's --, therefor.

In column 9, line 60, in Claim 17, delete "claim 1" and insert -- claim 16 --, therefor.

In column 10, line 57, in Claim 20, delete "art" and insert -- part --, therefor.

In column 12, line 17, in Claim 24, delete "than printed" and insert -- than by being printed --, therefor.

Signed and Sealed this
Sixth Day of September, 2011

David J. Kappos
*Director of the United States Patent and Trademark Office*